United States Patent
Zhang et al.

(10) Patent No.: US 9,601,821 B2
(45) Date of Patent: Mar. 21, 2017

(54) LOAD CELL TOPOLOGY NETWORK BASED ON MULTI-BRANCH CABLES

(71) Applicants: Mettler Toledo (Changzhou) Measurement Technology Ltd., Jiangsu (CN); Mettler Toledo (Changzhou) Precision Instrument Ltd., Jiangsu (CN); Mettler Toledo (Changzhou) Scale & System Ltd., Jiangsu (CN)

(72) Inventors: Ying Zhang, Jiangsu (CN); Zijian Zhu, Jiangsu (CN); Xiuzhu Xu, Jiangsu (CN)

(73) Assignees: Mettler Toledo (Changzhou) Measurement Technology Ltd., Changzhou, Jiangsu (CN); Mettler Toledo (Changzhou) Precision Instrument Ltd., Changzhou, Jiangsu (CN); Mettler Toledo (Changzhou) Scale & System Ltd., Changzhou, Jiangsu (CN)

( * ) Notice: Subject to any disclaimer, the term of this patent is extended or adjusted under 35 U.S.C. 154(b) by 21 days.

(21) Appl. No.: 14/430,623

(22) PCT Filed: May 20, 2013

(86) PCT No.: PCT/CN2013/075896
§ 371 (c)(1),
(2) Date: Mar. 24, 2015

(87) PCT Pub. No.: WO2014/044056
PCT Pub. Date: Mar. 27, 2014

(65) Prior Publication Data
US 2015/0280304 A1    Oct. 1, 2015

(30) Foreign Application Priority Data

Sep. 24, 2012 (CN) .......................... 2012 1 0358228

(51) Int. Cl.
*H01P 5/12* (2006.01)
*G01G 23/00* (2006.01)
*G01G 23/37* (2006.01)

(52) U.S. Cl.
CPC ............... *H01P 5/12* (2013.01); *G01G 23/00* (2013.01); *G01G 23/3735* (2013.01)

(58) Field of Classification Search
CPC ....... H01P 5/12; G01G 23/00; G01G 23/3735
(Continued)

(56) References Cited

U.S. PATENT DOCUMENTS 3,617,990 A * 11/1971 Colardeau .............. H01R 24/40
439/578
5,301,208 A * 4/1994 Rhodes .................... H04B 3/00
333/130

(Continued)

FOREIGN PATENT DOCUMENTS

| CN | 201007851 Y | 1/2008 |
| CN | 102042864 A | 5/2011 |
| CN | 202793571 U | 3/2013 |

*Primary Examiner* — Robert Pascal
*Assistant Examiner* — Kimberly Glenn
(74) *Attorney, Agent, or Firm* — Standley Law Group LLP

(57) ABSTRACT

The present invention relates to a load cell topology network comprising at least one multi-branch cable and a plurality of load cells. Each multi-branch cable comprises at least three connectors and one or more groups of signal lines; each group of signal lines comprise at least three branch signal lines, with one end of each branch signal line connected to at least three connectors described respectively and correspondingly, and the other end of each branch signal line connected to a common node, thereby realizing the interconnection of the same kinds of electrical signals between respective connectors; each connector is adapted to be connected to another multi-branch cable or a load cell. The (Continued)

plurality of load cells are electrically connected by the multi-branch cable to form a topology network.

6 Claims, 4 Drawing Sheets

(58) Field of Classification Search
USPC .......................................................... 333/127
See application file for complete search history.

(56) References Cited

U.S. PATENT DOCUMENTS

| | | | |
|---|---|---|---|
| 5,889,444 A * | 3/1999 | Johnson | H01P 5/12 |
| | | | 333/127 |
| 7,190,240 B2 * | 3/2007 | Podell | H01P 5/187 |
| | | | 333/109 |
| 7,305,324 B2 | 12/2007 | Beshears et al. | |
| 7,733,224 B2 | 6/2010 | Tran | |
| 8,461,988 B2 | 6/2013 | Tran | |
| 8,525,673 B2 | 9/2013 | Tran | |
| 8,525,687 B2 | 9/2013 | Tran | |
| 8,531,291 B2 | 9/2013 | Tran | |
| 8,648,266 B2 | 2/2014 | Bucher et al. | |
| 8,680,991 B2 | 3/2014 | Tran | |

\* cited by examiner

LOAD CELL TOPOLOGY NETWORK BASED ON MULTI-BRANCH CABLES

TECHNICAL FIELD

The present invention relates to a load cell topology network, and particularly relates to a load cell topology network based on multi-branch cables.

BACKGROUND ART

In the existing implementations of load cell topology network, connections are usually realized by use of traditional cables. In particular, networking of the load cell topology network is realized by connecting one end of a cable with load cells and the other end of the cable with a junction box, then connecting the junction box with instruments or other terminal devices by cables. In the existing implementations of load cell topology network utilizing traditional cables, dedicated junction boxes are needed, with non-flexible manner of connections, long wiring length and high cost. Besides, it is not convenient in future maintenance because, when a load cell replaced or added, the junction box has to be re-opened.

Chinese patent application CN200910197623.1 discloses a double connector structure designed for serially connecting load cells in order to achieve the topology networking. This solution eliminates the need for digital junction boxes, but it can only achieve serial connections, thus possessing certain limitations; further, it has to assemble a double connector structure on the load cells, thus increasing cost and difficulties in manufacturing.

SUMMARY OF THE INVENTION

An object of the present invention is to provide a load cell topology network based on multi-branch cables.

The load cell topology network of the present invention comprises at least one multi-branch cable and a plurality of load cells. Each multi-branch cable comprises at least three connectors and one or more groups of signal lines; each group of signal lines comprise at least three branch signal lines, with one end of each branch signal line connected to at least three connectors described respectively and correspondingly, and the other end of each branch signal line connected to a common node, thereby realizing the interconnection of the same kinds of electrical signals between respective connectors; each connector is adapted to be connected to another multi-branch cable or a load cell. The plurality of load cells are electrically connected by the multi-branch cable to form a topology network.

In one embodiment of the present invention,—at least three connectors on each multi-branch cable described comprise male connectors adapted to mate with female connectors on the load cells.

In one embodiment of the present invention, at least three connectors on each multi-branch cable described comprise female connectors adapted to mate with male connectors on another multi-branch cable.

In one embodiment of the present invention, load cell topology network described is a daisy-chain topology network.

In one embodiment of the present invention, load cell topology network described is a bus topology network.

In one embodiment of the present invention, load cell topology network described is a cascaded topology network.

With the above technical solutions, convenient networking of the load cells is realized by the present invention with use of multi-branch cables and without use of junction boxes, so as to achieve topology networking of a weighing system. Besides, different networking topology may be realized flexibly by different configurations of the multi-branch cables, without modifying the design of load cells per se.

BRIEF DESCRIPTION OF THE DRAWINGS

The above objectives, features and advantages of the present invention will be better understood by the following description of the specific embodiments of the present invention, in conjunction with the accompanying drawings wherein.

DETAILED DESCRIPTION

Embodiments of the present invention present a load cell topology network based on multi-branch cables. Conventional cables may be regarded as having two branches, which can achieve the electrical connection between two nodes (including connection between the sensors or connection between the sensor and the junction boxes and instruments). The multi-branch cable of the present invention can achieve interconnection of the same kinds of electrical signals between at least three terminals, thus realizing electrical connections between a plurality of nodes.

Figure 1:
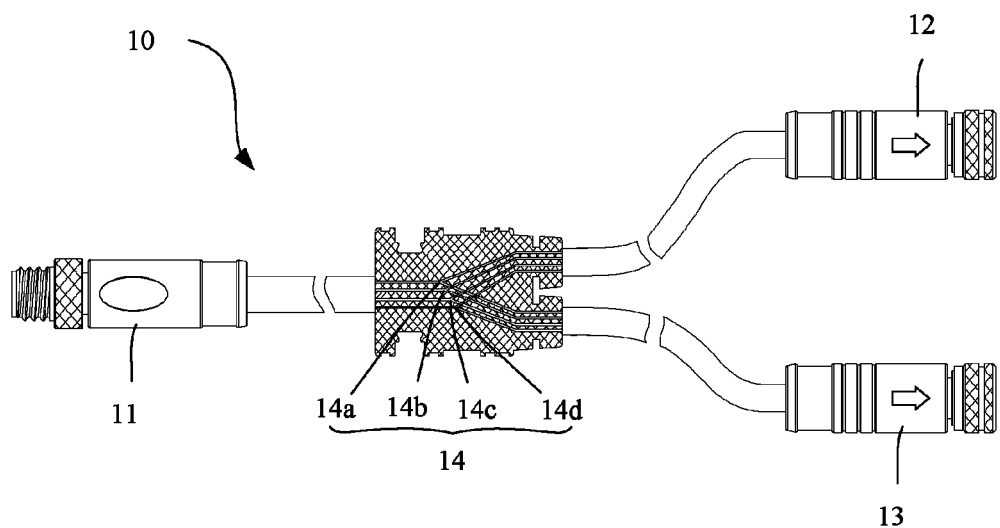
FIG. 1 shows a view of a multi-branch cable structure.

FIG. 1 shows a view of a multi-branch cable structure. Referring to FIG. 1, the multi-branch cable comprises at least three connectors as a well as one or more groups of signal lines 14. FIG. 1 illustrates an example of three connectors, including a first connector 11, a second connector 12 and a third connector 13. FIG. 1 shows four groups of signal lines 14a, 14b, 14c and 14d (and collectively designated as 14). Each group of signal lines comprise at least three branch signal lines, wit one end of each branch signal line connected to a respective connector, such as the first connector 11, the second connector 12 or the third connector 13, and the other end of each signal line connected to a common node, so as to achieve the interconnection of the same kinds of electrical signals between the respective connectors. In FIG. 1, these common nodes are depicted at the contact points of the lead lines for the branch signal lines 14a, 14b, 14c and 14d. Each group of branch signal lines may carry at least one signal, and a skilled person in the art may choose the number of groups of the branch signal lines as desired.

In the embodiment of the present invention, connectors of the multi-branch cable 10 may comprise male connectors and female connectors mated with each other. For example, each connector of the multi-branch cable 10 may be a male connector, a female connector, or some of the connectors may be male connectors and some of the connectors may be female connectors. All of the connectors in the load cells may be female connectors, and the male connectors of the connectors in the multi-branch cable may connect with the female connectors of the load cells. In addition, each multi-branch cable may be provided with female connectors as desired, for connecting with the male connectors on other multi-branch cables.

In embodiments of the present invention, the number of the branches of a cable is not particularly limited. For example, the cable may have three branches, four branches or even more branches.

Each connector of the multi-branch cable 10 may be connected to a load cell or another multi-branch cable respectively, so as to achieve topology networking. Several examples of topology networking are illustrated hereinafter.

Figure 2:
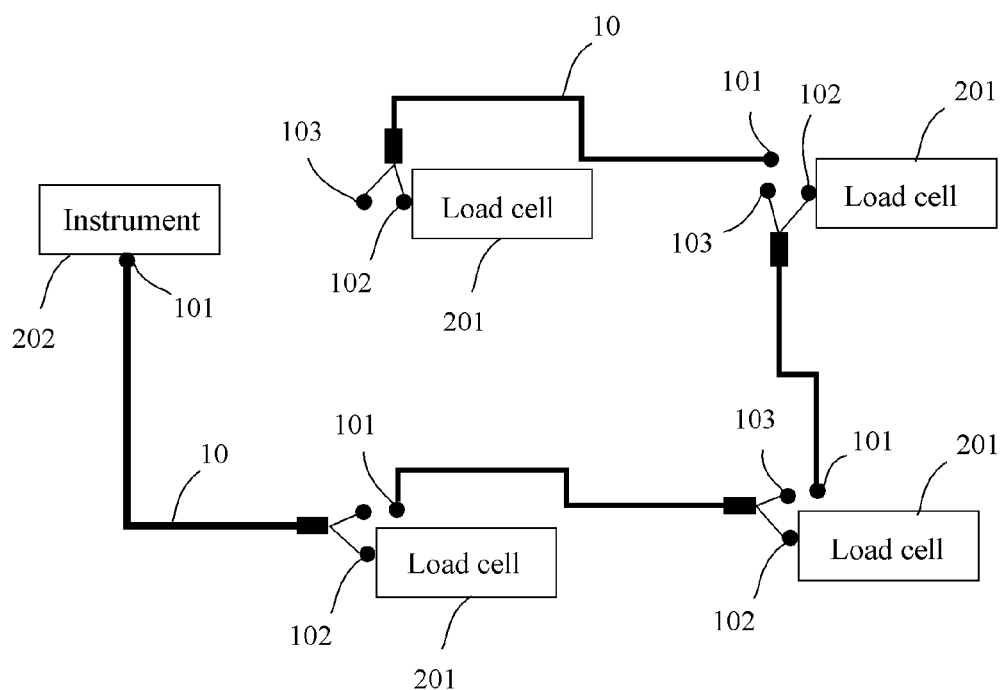
FIG. 2 shows a load cell daisy chain topology network implemented based on three-branch cables according to an embodiment of the present invention.

FIG. 2 shows a load cell daisy chain topology network implemented based on three-branch cables according to an embodiment of the present invention. As shown in FIG. 2, the daisy chain topology networking may be implemented at least partially with three-branch cables. Specifically, without use of junction boxes, networking of the load cells may be accomplished by connecting the connector on branch 102 of each three-branch cable 10 with a load cell 201, and connecting the connectors on branch 101 and branch 103 with other three-branch cables or instrument 202.

Figure 3:
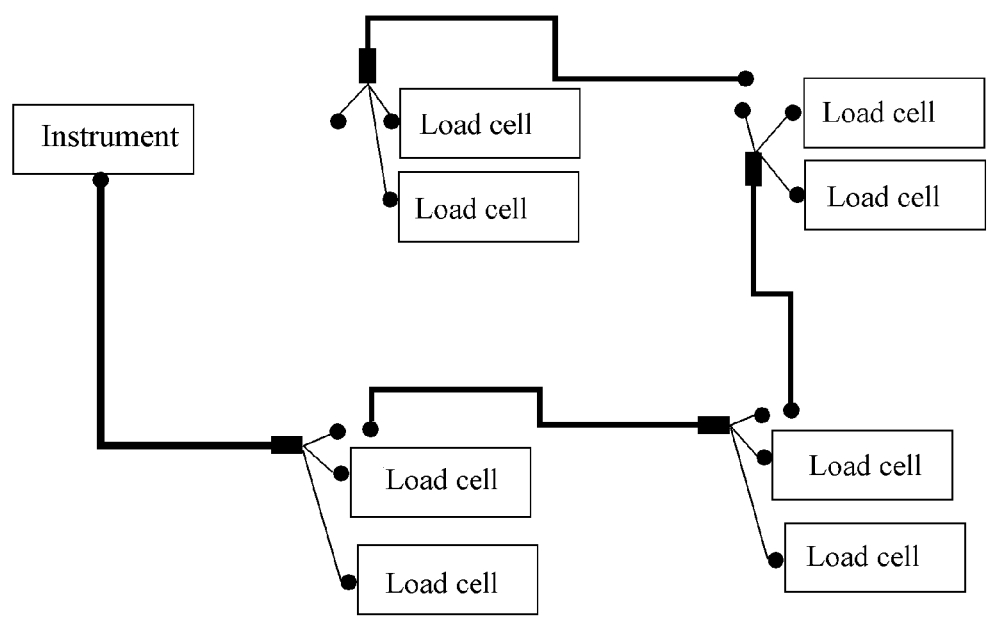
FIG. 3 shows a load cell bus topology network implemented based on four-branch cables according to another embodiment of the present invention.

FIG. 3 shows a load cell bus topology network implemented with four-branch cables according to another embodiment of the present invention. Referring to FIG. 3, without use of junction boxes, bus topology networking of the load cells may be accomplished by connecting two branches of each four-branch cable with load cells, and connecting the other two branches with other four-branch cables or instruments.

Figure 4:
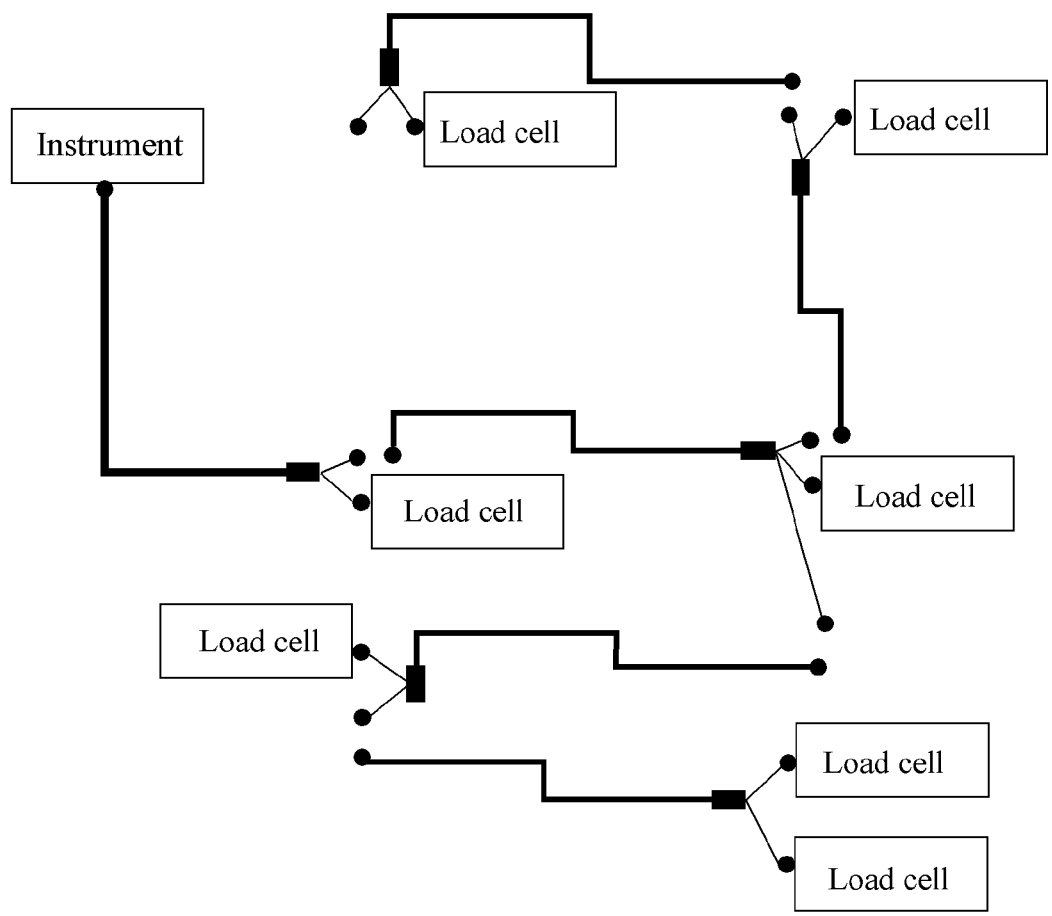
FIG. 4 shows a duplicated cascaded topology network implemented based on multi-branch cables according to a further embodiment of the present invention.

FIG. 4 shows a duplicated cascaded topology network implemented based on multi-branch cables according to a further embodiment of the present invention. Referring to FIG. 4, without use of junction boxes, the cascaded topology network of lead cells may be accomplished by connecting various topology networks in cascade with use of three-branch cables and four-branch cables.

Topology networking of a weighing system is realized by the above embodiments of the present invention with use of multi-branch cables and without use of junction boxes. Besides, different networking topology may be realized flexibly by different configurations of the multi-branch cables, without modifying the design of load cells per se.

Although the present invention has been described with preferred embodiments as above, such embodiments are not intended to limit the present invention. Several modifications and improvements can be made by a skilled in the art, without departing from the spirit and scope of the present invention. Thus, the extent of protection for the present invention shall be determined by the appended claims.

What is claimed is:

1. A load cell topology network, comprising:
at least two multi-branch cables, each of which comprises:
at least three connectors, each of the connectors adapted for connection to another multi-branch cable or to a load cell; and
at least one group of signal lines; each of the signal lines comprising:
a common node; and
a plurality of branch signal lines emanating from the common node, the plurality of branch signal lines corresponding to the number of connectors, such that an end of each of the branch signal lines are connected to a corresponding one of the at least three connectors, thereby realizing an interconnection of the same kinds of electrical signals between respective connectors; each of the connectors are adapted to be connected to another one of the multi-branch cables or a load cell; and
at least three load cells, each of the load cells connected electrically to at least one of the multi-branch cables, forming the topology network.

2. The load cell topology network of claim 1, wherein:
each of the connectors on at least one of the multi-branch cables is a male connector that mates with a female connector on one of the load cells.

3. The load cell topology network of claim 1, wherein:
each of the connectors on at least one of the multi-branch cables is a female connector that mates with a male connector on another of the multi-branch cables.

4. The load cell topology network of claim 1, wherein said load cell topology network is a daisy-chain topology network.

5. The load cell topology network of claim 1, wherein said load cell topology network is a bus topology network.

6. The load cell topology network of claim 1, wherein said load cell topology network is a cascaded topology network.

* * * * *